(12) United States Patent
Bai (10) Patent No.: US 11,342,773 B2
(45) Date of Patent: May 24, 2022

(54) STEP-DOWN CONVERSION CIRCUIT ASSEMBLY AND ELECTRONIC DEVICE

(71) Applicant: GUANGDONG OPPO MOBILE TELECOMMUNICATIONS CORP., LTD., Guangdong (CN)

(72) Inventor: Jian Bai, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 40 days.

(21) Appl. No.: 17/020,751

(22) Filed: Sep. 14, 2020

(65) Prior Publication Data

US 2020/0412131 A1 Dec. 31, 2020

Related U.S. Application Data

(63) Continuation of application No. PCT/CN2018/085701, filed on May 4, 2018.

(51) Int. Cl.
*H02J 7/00* (2006.01)
*H02J 50/80* (2016.01)

(52) U.S. Cl.
CPC .......... *H02J 7/007* (2013.01); *H02J 7/00309* (2020.01); *H02J 50/80* (2016.02); *H02J 2207/20* (2020.01)

(58) Field of Classification Search
CPC .... H02J 7/007; H02J 7/00309; H02J 2207/20; H02J 50/80

(Continued)

(56) References Cited

U.S. PATENT DOCUMENTS 5,831,847 A * 11/1998 Love ................... H05K 7/20945
363/141
2003/0117760 A1 * 6/2003 Meir ......................... G06F 1/20
361/103

(Continued)

FOREIGN PATENT DOCUMENTS

CN 201018399 2/2008
CN 203326874 12/2013

(Continued)

OTHER PUBLICATIONS

WIPO, ISR for PCT/CN2018/085701, dated Feb. 11, 2019.

(Continued)

*Primary Examiner* — Edward Tso
*Assistant Examiner* — Aaron Piggush
(74) *Attorney, Agent, or Firm* — Hodgson Russ LLP (57) ABSTRACT

A step-down conversion circuit assembly and an electronic device are provided. The step-down conversion circuit assembly includes a box body, a step-down conversion circuit, a heat dissipation element, and a fan. The box body has multiple side walls, where the multiple side walls define an enclosed accommodating space, and the box body defines an air outlet on one of the multiple side walls. The step-down conversion circuit is disposed in the accommodating space of the box body. The heat dissipation element is disposed in the accommodating space of the box body and attached to the step-down conversion circuit for conducting heat. The fan is disposed between the step-down conversion circuit and the air outlet and configured to enable the heat in the accommodating space to exit from the air outlet.

20 Claims, 7 Drawing Sheets

(58) Field of Classification Search
USPC .................................. 320/107, 114, 134, 150
See application file for complete search history.

(56) References Cited

U.S. PATENT DOCUMENTS

| | | | |
|---|---|---|---|
| 2016/0021768 A1* | 1/2016 | Webster | ................. H05K 7/206 |
| | | | 165/80.2 |
| 2017/0006697 A1 | 1/2017 | Yoneda | |
| 2017/0129344 A1* | 5/2017 | Islinger | ................. B60L 53/126 |
| 2017/0238401 A1* | 8/2017 | Sadwick | ............. H05B 47/195 |
| | | | 315/294 |
| 2019/0132969 A1* | 5/2019 | Hirose | ............... H05K 7/20154 |
| 2020/0146178 A1 | 5/2020 | Horng et al. | |

FOREIGN PATENT DOCUMENTS

| | | |
|---|---|---|
| CN | 106059287 | 10/2016 |
| CN | 207234476 U | 4/2018 |
| CN | 207304170 U | 5/2018 |
| JP | 2010153533 | 7/2010 |
| WO | 2017169169 A1 | 10/2017 |

OTHER PUBLICATIONS

IPIN, First Examination Report for IN Application No. 202017036025, dated Dec. 28, 2020.
EPO, Extended European search report for EP Application No. 18917557.3, dated Jan. 15, 2021.

* cited by examiner

STEP-DOWN CONVERSION CIRCUIT ASSEMBLY AND ELECTRONIC DEVICE

CROSS-REFERENCE TO RELATED APPLICATION(S)

This application is a continuation of International Application No. PCT/CN2018/085701, filed on May 4, 2018, the entire disclosure of which is incorporated by reference herein.

TECHNICAL FIELD

This disclosure relates to the technical field of wireless charging, and particularly to a step-down conversion circuit assembly and an electronic device.

BACKGROUND

With the development of technology, terminals (such as mobile phones) have increasingly various function, and power consumption of the terminals is also increasing. Therefore, the terminal needs to be charged frequently.

At present, if temperature of a power inductor of a step-down conversion circuit (BUCK circuit) for wireless quick charging is too high, the step-down conversion circuit (BUCK circuit) cannot work normally due to over-temperature protection. However, if heat dissipation measures are applied to the mobile phone, i.e., the heat is conducted to a main board of the mobile phone to be dissipated, the overall temperature rise of the mobile phone is increased, thereby affecting user experience.

SUMMARY

The disclosure provides a step-down conversion circuit assembly and an electronic device, to improve heat dissipation effect of a step-down conversion circuit.

According to a first aspect, a step-down conversion circuit assembly is provided. The step-down conversion circuit assembly includes a box body, a step-down conversion circuit, a heat dissipation element, and a fan. The box body has multiple side walls, where the multiple side walls define an enclosed accommodating space, and the box body defines an air outlet on one of the multiple side walls. The step-down conversion circuit is disposed in the accommodating space of the box body. The heat dissipation element is disposed in the accommodating space of the box body and attached to the step-down conversion circuit for conducting heat. The fan is disposed between the step-down conversion circuit and the air outlet and configured to enable the heat in the accommodating space to exit from the air outlet.

According to a second aspect, an electronic device is provided. The electronic device includes a step-down conversion circuit assembly. The step-down conversion circuit assembly includes a box body, a step-down conversion circuit, a heat dissipation element, and a fan. The box body has multiple side walls, where the multiple side walls define an enclosed accommodating space, and the box body defines an air outlet on one of the multiple side walls. The step-down conversion circuit is disposed in the accommodating space of the box body. The heat dissipation element is disposed in the accommodating space of the box body and attached to the step-down conversion circuit for conducting heat. The fan is disposed between the step-down conversion circuit and the air outlet and configured to enable the heat in the accommodating space to exit from the air outlet.

According to a third aspect, a step-down conversion circuit assembly is provided. The step-down conversion circuit assembly includes a box body, a step-down conversion circuit, a heat dissipation element, and a fan. The box body defines an air outlet extending through a side wall of the box body. The step-down conversion circuit is disposed in the box body. The heat dissipation element is disposed in the box body and attached to a surface of the step-down conversion circuit, where the heat dissipation element extends beyond the surface of the step-down conversion circuit and extends toward the air outlet. The fan is disposed between the step-down conversion circuit and the air outlet and configured to enable the heat in the box to exit from the air outlet.

BRIEF DESCRIPTION OF THE DRAWINGS

To describe technical solutions in embodiments of the disclosure more clearly, the following briefly introduces accompanying drawings required for illustrating the embodiments. Apparently, the accompanying drawings in the following description illustrate some embodiments of the disclosure. Those of ordinary skill in the art may also obtain other drawings based on these accompanying drawings without creative efforts.

DETAILED DESCRIPTION

Technical solutions in embodiments of the disclosure will be described clearly and completely hereinafter with reference to the accompanying drawings described in the previous chapter. Apparently, the described embodiments are merely some rather than all embodiments of the disclosure. All other embodiments obtained by those of ordinary skill in the art based on the embodiments of the disclosure without creative efforts shall fall within the protection scope of the disclosure.

It should be understood that terms such as "center", "longitudinal", "lateral", "length", "width", "thickness", "on", "under", "front", "back", "left", "right", "vertical", "horizontal", "top", "bottom", "in", "out", "clockwise", "anticlockwise", "axial", "radial", "circumferential", and the like referred to herein which indicate directional relationship or positional relationship are directional relationship or positional relationship based on accompanying drawings and are only for the convenience of description and simplicity, rather than explicitly or implicitly indicate that apparatuses or components referred to herein must have a certain direction or be configured or operated in a certain direction and therefore cannot be understood as limitation on the disclosure. In addition, terms "first", "second", and the like are only used for description and cannot be understood as explicitly or implicitly indicating relative importance or implicitly indicating the number of technical features referred to herein. Therefore, features restricted by terms "first", "second", and the like can explicitly or implicitly include one or more of the features. In the context of the disclosure, unless stated otherwise, "multiple" refers to "two or more", such as two, three, and the like.

Unless stated otherwise, in the disclosure, terms "installing", "coupling", "connecting", "fixing", and the like referred to herein should be understood in broader sense. For example, coupling may be a fixed coupling, a removable coupling, or an integrated coupling, may be a mechanical coupling, an electrical coupling, and may be a direct coupling, an indirect coupling through a medium, or a communication coupling between two components or an interaction coupling between two components, unless stated otherwise. For those of ordinary skill in the art, the above terms in the disclosure can be understood according to specific situations.

Unless stated otherwise, in the disclosure, a first feature being "on" or "under" a second feature referred to herein can refer to a direct contact between the first feature and the second feature or an indirect contact between the first feature and the second feature via a medium. In addition, the first feature being "above", "over", and "on" the second feature can be the first feature being right above or obliquely above the second feature or only refers to the first feature being at a higher horizontal level than the second feature. The first feature being "below", "underneath", and "under" the second feature can be the first feature being right below or obliquely below the second feature or only refers to the first feature being at a lower horizontal level than the second feature.

The following disclosure provides multiple different embodiments or examples to achieve different structures of the disclosure. To simplify the disclosure of the disclosure, description of the components and arrangements of some examples is given below. They are only illustrative and not intended to limit the disclosure. Moreover, in the disclosure, reference numbers and/or letters may be repeated in different embodiments. Such repetition is for the purposes of simplification and clearness, and does not denote the relationship between respective embodiments and/or arrangements being discussed. In addition, the disclosure provides various examples for specific process and materials. However, it is obvious for a person of ordinary skill in the art that other process and/or materials may alternatively be utilized.

Embodiments of the disclosure provide a step-down conversion circuit assembly and an electronic device. The following will describe the embodiments in detail.

The wireless charging technology can achieve power transmission without cables, so that the wireless charging technology is increasingly popular.

According to the wireless charging technology, an adapter is generally coupled with a wireless charging device (such as a wireless charging base), and through the wireless charging device, output power of the adapter is transmitted to the electronic device in a wireless manner (such as electromagnetic waves), to wirelessly charge the electronic device.

In terms of charging principle, the wireless charging is mainly implemented by magnetic coupling (or electromagnetic induction), magnetic resonance, or radio waves.

Currently, mainstream wireless charging standards include the QI standard, the power matters alliance (PMA) standard, and the alliance for wireless power (A4WP) standard. Both the QI standard and the PMA standard adopt magnetic coupling for wireless charging. The A4WP standard adopts magnetic resonance for wireless charging.

The wireless charging device may include a voltage conversion circuit, a wireless transmitting circuit, and a first control module. The voltage conversion circuit is electrically coupled to both the adapter and the wireless transmitting circuit. The wireless transmitting circuit is configured to emit energy for charging the electronic device. The first control module is electrically coupled to both the voltage conversion circuit and the wireless transmitting circuit. The voltage conversion circuit is configured to conduct voltage conversion on power voltage that is input to the wireless charging device. For example, convert input mains electricity (such as 220V) into suitable voltage (such as 15V, 12V, 9V, etc.). The wireless transmitting circuit is configured to convert electric energy into electromagnetic energy, and then emit the electromagnetic energy. The first control module is configured to switch on or switch off the voltage conversion circuit and the wireless transmitting circuit. The first control module can further be configured to detect whether returned information from a device to-be-charged is received, and then switch on or switch off the voltage conversion circuit and the wireless transmitting circuit according to the returned information.

The electronic device includes a wireless receiving circuit, a step-down conversion circuit, and a battery that are electrically coupled in sequence. The electronic device further includes a second control module that is electrically coupled with both the wireless receiving circuit and the step-down conversion circuit. The wireless receiving circuit is configured to receive the electromagnetic energy emitted by the wireless transmitting circuit of the wireless charging device, and convert the electromagnetic energy into electric energy. The step-down conversion circuit is configured to step down the electric energy converted from the electromagnetic energy (such as step down from 15V to 9V, from 9V to 5V, etc.). In an example, the step-down conversion circuit is configured to convert high-voltage and low-current output from the wireless receiving circuit into low-voltage and high-current. The second control module can be configured to switch on or off the wireless receiving circuit and the step-down conversion circuit. The second control module can further be configured to detect whether information sent by the wireless charging device is received, and then switch on or off the wireless receiving circuit and the step-down conversion circuit according to the information received.

The high-voltage and low-current output from the wireless receiving circuit is input into the step-down conversion circuit, and the step-down conversion circuit then outputs the low-voltage and high-current. Subjected to such conversion, the step-down conversion circuit may generate much heat. However, if the heat on the step-down conversion circuit is directly conducted to a main board or other parts of a mobile phone, overall temperature of the mobile phone may be increased, which may bring pressure on the temperature rise of a system. Therefore, the disclosure provides a step-down conversion circuit assembly and an electronic device.

The following will describe the step-down conversion circuit assembly and the electronic device of embodiments of the disclosure in detail in conjunction with accompanying figures.

Figure 1:
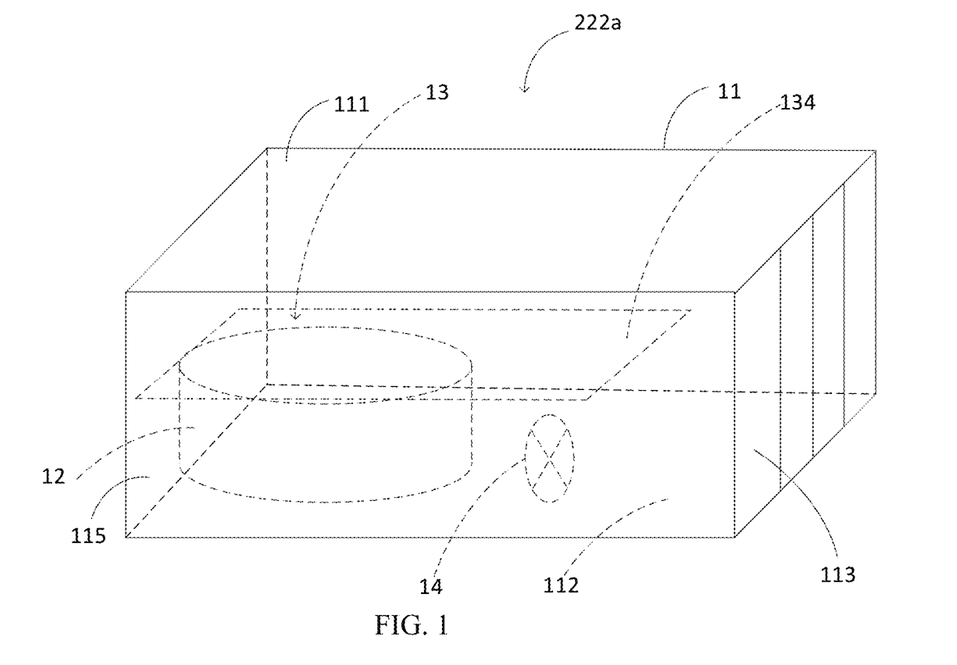
FIG. 1 is a first schematic structural diagram illustrating a step-down conversion circuit assembly according to embodiments of the present disclosure.

FIG. 1 is a first schematic structural diagram illustrating a step-down conversion circuit assembly 222a according to embodiments. As illustrated in FIG. 1, the step-down conversion circuit assembly 222a includes a box body 11, a step-down conversion circuit 12, a heat dissipation element 13, and a fan 14.

The box body 11 has multiple side walls 111, where the multiple side walls 111 define an enclosed accommodating space 112, and the box body 11 defines an air outlet 113 on one of the multiple side walls 111. The step-down conversion circuit 12 is disposed in the accommodating space 112 of the box body 11. The heat dissipation element 13 is disposed in the accommodating space 112 of the box body 11 and attached to the step-down conversion circuit 12 for contacting the step-down conversion circuit 12 and conducting heat. The fan 14 is disposed between the step-down conversion circuit 12 and the air outlet 113 and configured to enable the heat in the accommodating space 112 to exit from the air outlet 113.

According to the embodiments, the step-down conversion circuit 12 is disposed in the accommodating space 112 of the box body 11, and both the heat dissipation element 13 and the fan 14 are disposed in the accommodating space 112. The heat dissipation element 13 is attached to the step-down conversion circuit 12 for conducting the heat, to accelerate heat dissipation of the step-down conversion circuit 12. The fan 14 can accelerate air motion (i.e., motion of air) and thus accelerate heat dissipation of the heat dissipation element 13, to enable the heat in the accommodating space 112 to exit from the air outlet 113. By separately performing heat dissipation for the step-down conversion circuit 12, wireless quick charging can be performed efficiently without affecting the overall temperature rise of the electronic device. According to the heat dissipation solution for the wireless quick charging provided in the disclosure, by separately performing heat dissipation for the step-down conversion circuit 12 (such as, BUCK circuit or Charge pump circuit, etc.), wireless quick charging can be performed efficiently without affecting the overall temperature rise of the mobile phone.

Figure 2:
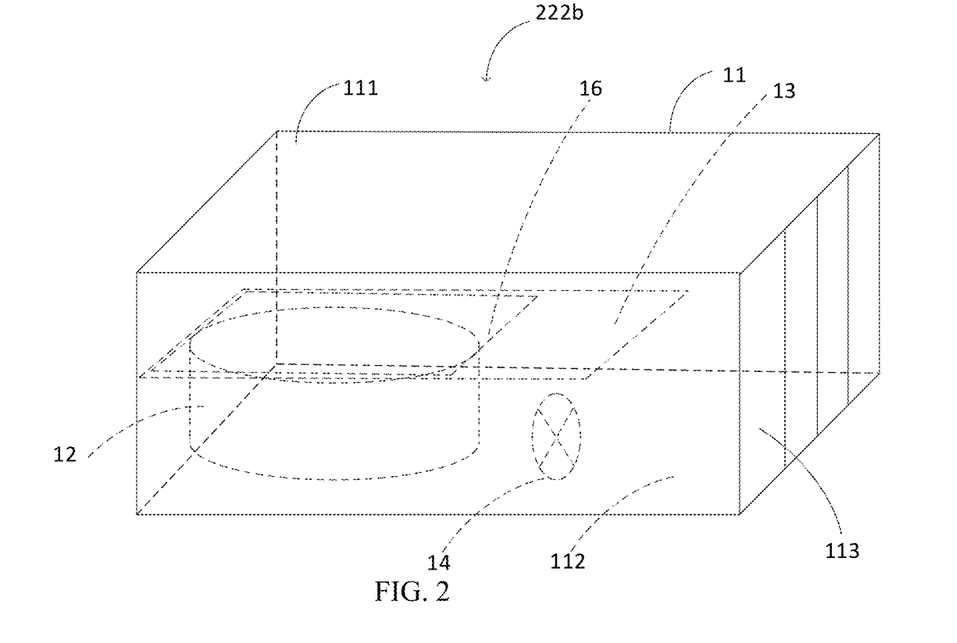
FIG. 2 is a second schematic structural diagram illustrating a step-down conversion circuit assembly according to embodiments of the present disclosure.

FIG. 2 is a second schematic structural diagram illustrating a step-down conversion circuit assembly 222b according to embodiments. As illustrated in FIG. 2, compared with the step-down conversion circuit assembly 222a, the heat dissipation element 13 is attached to the step-down conversion circuit 12 through a thermally conductive silica gel 16.

The heat dissipation element 13 is in contact with the step-down conversion circuit 12 and conducts heat through the full filling of the thermal conductive silica gel 16, which can accelerate heat conduction from the step-down conversion circuit 12 to the heat dissipation element 13.

Figure 3:
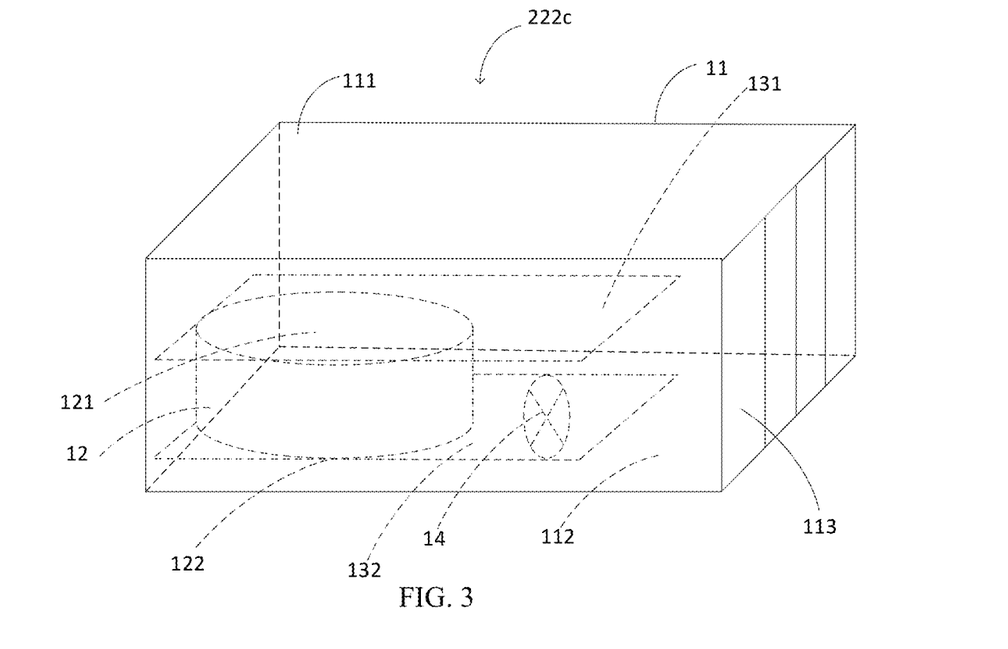
FIG. 3 is a third schematic structural diagram illustrating a step-down conversion circuit assembly according to embodiments of the present disclosure.

FIG. 3 is a third schematic structural diagram illustrating a step-down conversion circuit assembly 222c according to embodiments. As illustrated in FIG. 3, compared with the step-down conversion circuit assembly 222a, the heat dissipation element 13 is attached to a first surface 121 of the step-down conversion circuit 12 and has a larger area than the first surface 121.

The step-down conversion circuit 12 has the first surface 121. The heat dissipation element 13 is attached to the first surface 121 and has a larger area than the first surface 121, which can increase an area for heat dissipation and accelerate the cooling. The first surface 121 may be a side of a circuit board of the step-down conversion circuit 12, such as a bottom surface of the circuit board, or may be a side of a component that generates the most heat (such as a chip). Alternatively, the step-down conversion circuit 12 can be integrated in a box, and one side of the box is the first surface 121 of the step-down conversion circuit 12.

In at least one embodiment, the step-down conversion circuit 12 further has a second surface 122 opposite the first surface 121. The heat dissipation element 13 includes a first heat dissipation sub-element 131 attached to the first surface 121 and a second heat dissipation sub-element 132 attached to the second surface 122.

The first heat dissipation sub-element 131 and the second heat dissipation sub-element 132 are disposed on both the first surface 121 and second surface 122 of the step-down conversion circuit 12, respectively, to speed up heat dissipation. The first heat dissipation sub-element 131 may have a larger area than the first surface 121, and the second heat dissipation sub-element 132 may have a larger area than the second surface 122.

In at least one embodiment, the heat dissipation element 13 is perpendicular to the side wall where the air outlet 113 locates.

The fan 14 is disposed between the step-down conversion circuit 12 and the air outlet 113, and the heat dissipation element 13 is perpendicular to the side wall where the air outlet 113 locates. When the fan 14 is accelerating air motion, the air can be brought into contact with the heat dissipation element 13 as much as possible to accelerate the air motion on an outer surface of the heat dissipation element 13.

Figure 4:
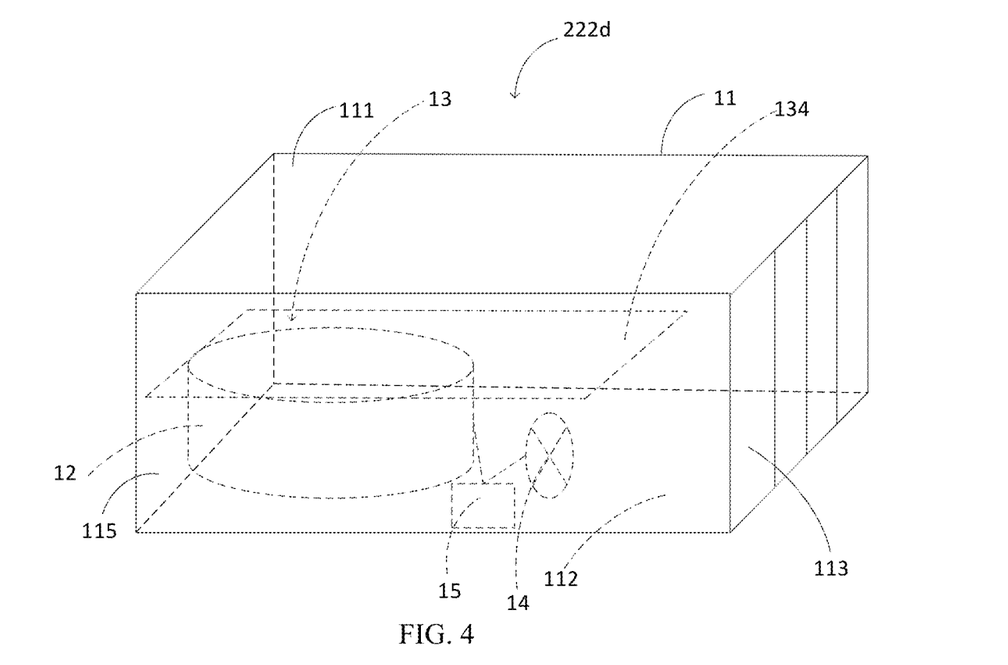
FIG. 4 is a fourth schematic structural diagram illustrating a step-down conversion circuit assembly according to embodiments of the present disclosure.

FIG. 4 is a fourth schematic structural diagram illustrating a step-down conversion circuit assembly 222d according to embodiments. As illustrated in FIG. 4, the box body 11 has an inner wall 115 opposite the air outlet 113. The step-down conversion circuit 12 is disposed at the inner wall 115 away from the air outlet 113. The heat dissipation element 13 includes an extension portion 134 extending beyond the step-down conversion circuit 12. The extension portion 134 is disposed between the step-down conversion circuit 12 and the air outlet 113.

The step-down conversion circuit 12 is disposed at the inner wall 115. The extension portion 134, of the heat dissipation element 13, extending beyond the step-down conversion circuit 12 is disposed between the step-down conversion circuit 12 and the air outlet 113. The extension portion 134 extends beyond the step-down conversion circuit 12, and the fan 14 is disposed between the step-down conversion circuit 12 and the air outlet 113, such that the air can be brought into contact with the heat dissipation element 13 as much as possible to accelerate the air motion on an outer surface of the heat dissipation element 13. In an example, the extension portion 134 can be disposed between the fan 14 and the air outlet 113.

Figure 5:
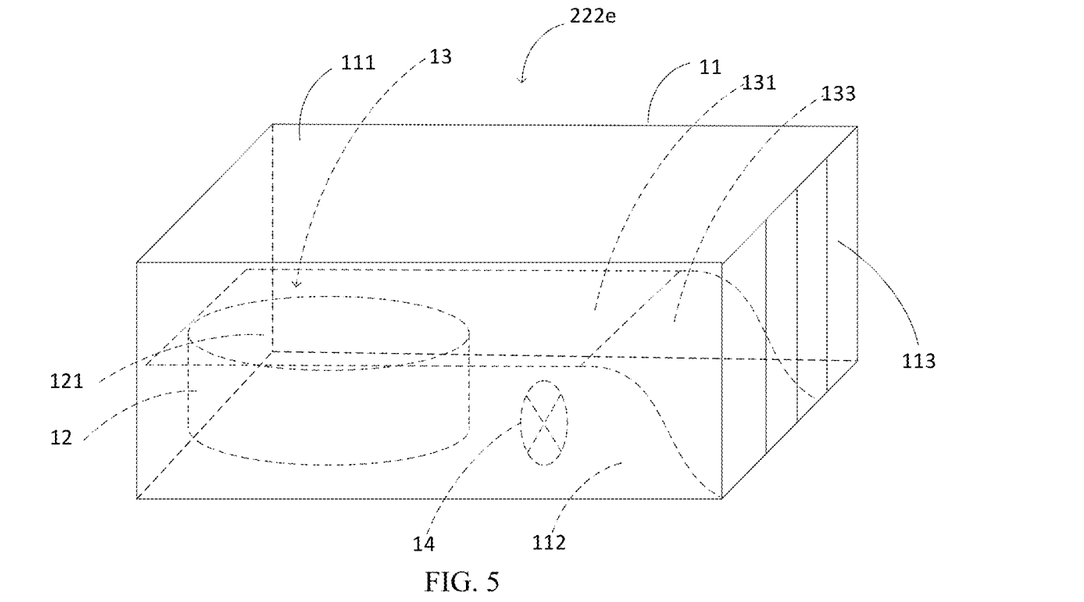
FIG. 5 is a fifth schematic structural diagram illustrating a step-down conversion circuit assembly according to embodiments of the present disclosure.

FIG. 5 is a fifth schematic structural diagram illustrating a step-down conversion circuit assembly 222e according to embodiments. As illustrated in FIG. 5, compared with the step-down conversion circuit assembly 222a, the heat dissipation element 13 includes the first heat dissipation sub-element 131 and a third heat dissipation sub-element 133. The first heat dissipation sub-element 131 is parallel to the first surface 121 of the step-down conversion circuit 12. The first surface 121 is perpendicular to the side wall where the air outlet 113 locates. The third heat dissipation sub-element 133 extends from an edge of the first heat dissipation sub-element 131 to the air outlet 113 and is disposed between the air outlet 113 and the step-down conversion circuit 12.

As such, an area of the heat dissipation element 13 can be enlarged, and the third heat dissipation sub-element 133 is disposed between the air outlet 113 and the step-down conversion circuit 12. When the fan 14 is accelerating air motion, the air exits from the air outlet 113 through the third heat dissipation sub-element 133, accelerating cooling of the accommodating space 112.

In at least one example, the third heat dissipation sub-element 133 is arc-shaped.

The arc-shaped third heat dissipation sub-element 133 enlarges the area for heat dissipation as much as possible within the limited accommodating space 112.

In at least one example, the third heat dissipation sub-element 133 is perpendicular to the first heat dissipation sub-element 131.

As such, it is convenient to dispose the third heat dissipation sub-element 133. The third heat dissipation element 133 can be coupled with the first heat dissipation sub-element 131 through an arc-shaped connecting portion, which has a natural transition and better heat dissipation effect.

In at least one embodiment, the third heat dissipation sub-element 133 extends to the side wall 111 of the box body 11 or the air outlet 113.

The third heat dissipation sub-element 133 can extend to the air outlet 113, or can extend to the side wall 111 of the box body 11, to increase the area for heat dissipation as much as possible. The third heat dissipation sub-element 133 can also extend to the air outlet 113, such that the heat dissipation of the heat dissipation element 13 at the air outlet 113 can be accelerated.

Figure 6:
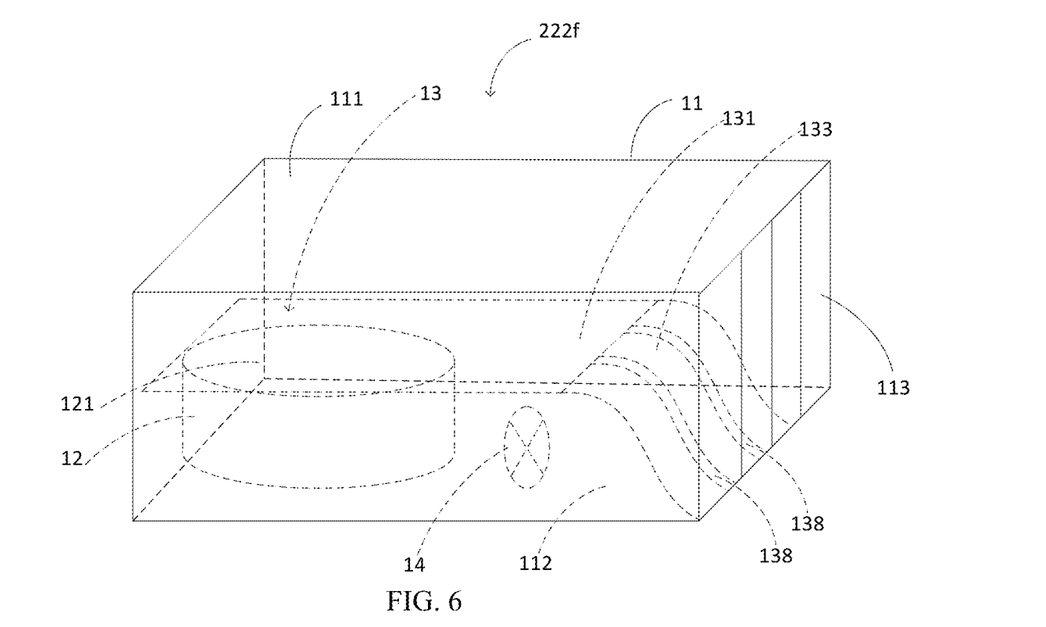
FIG. 6 is a sixth schematic structural diagram illustrating a step-down conversion circuit assembly according to embodiments of the present disclosure.

FIG. 6 is a sixth schematic structural diagram illustrating a step-down conversion circuit assembly 222f according to embodiments. As illustrated in FIG. 6, compared with the step-down conversion circuit assembly 222e, the third heat dissipation sub-element 133 defines multiple notches 138 on the middle of the third heat dissipation sub-element 133. The accommodating space 112 is in communication with the air outlet 113 through the multiple notches 138.

The third heat dissipation sub-element 133 defines the multiple notches 138 on the middle of the third heat dissipation sub-element 133. The notch 138 may be a circular hole, a bar-shaped opening, or the like, so that the air in the accommodating space 112 passes through the notch 138 and exits from the accommodating space 112 via the air outlet 113.

In at least one embodiment, the third heat dissipation sub-element 133 includes multiple bosses, where each two bosses define one notch 138.

There are bosses on both sides of the notch 138, which increases an area for heat dissipation of the heat dissipation element 13. Meanwhile, the notch 138 is between the two bosses, which allows the air to pass through and exit from the air outlet 113 for better heat dissipation.

Referring to FIG. 4, a wireless charging assembly includes a circuit detection module 15. The circuit detection module 15 is configured to detect a temperature in the step-down conversion circuit 12 or the accommodating space 112, and control a rotational speed of the fan 14 according to the temperature.

The rotational speed of the fan 14 is adjustable. The circuit detection module 15 detects the temperature in the step-down conversion circuit 12 or the accommodating space 112, and then adjusts the rotational speed of the fan 14 according to the temperature, where the higher the temperature, the higher the rotational speed. As higher rotational speed of the fan 14 leads to louder noise, adjusting the rotational speed of the fan 14 according to the temperature in the step-down conversion circuit 12 or the accommodating space 112 can take into account both noise reduction and temperature reduction.

Figure 7:
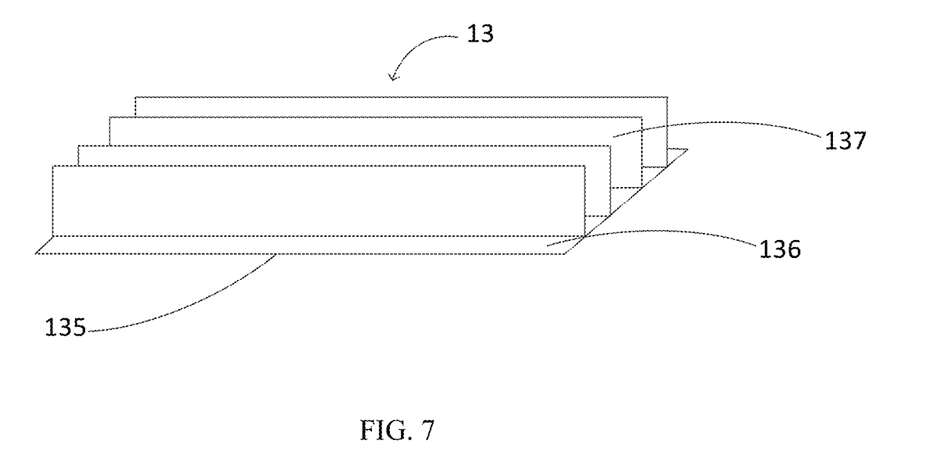
FIG. 7 is a schematic structural diagram illustrating a heat dissipation element according to embodiments of the present disclosure.

FIG. 7 is a schematic structural diagram illustrating a heat dissipation element according to embodiments. As illustrated in FIG. 7, the heat dissipation element 13 has a first surface 135 attached to the step-down conversion circuit 12 and a second surface 136 opposite the first surface 135. The second surface 136 are provided with multiple bosses 137.

The first surface 135 of the heat dissipation element 13 is attached to the step-down conversion circuit 12, the second surface 136 of the heat dissipation element 13 is exposed to the air in the accommodating space 112, and the multiple bosses 137 are provided on the second surface 136. As such, the area for heat dissipation of the second surface 136 can be increased, and the heat dissipation of the heat dissipation element 13 can be accelerated.

Figure 8:
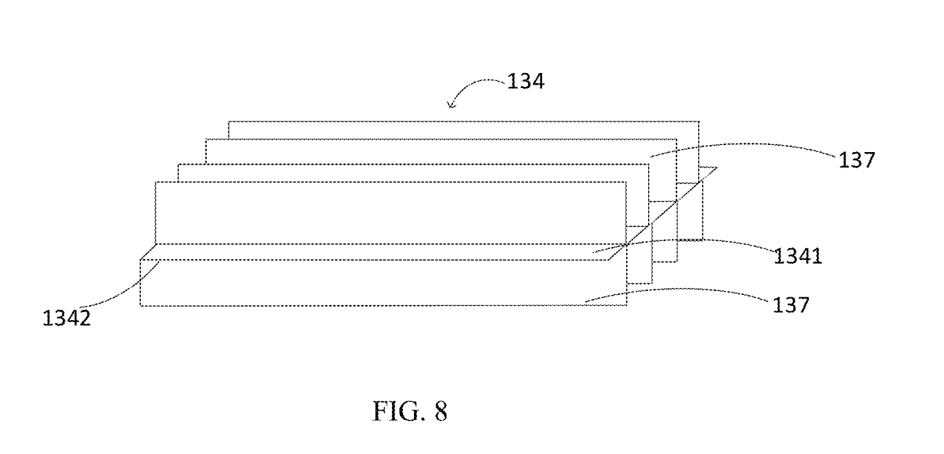
FIG. 8 is a schematic structural diagram illustrating an extension portion of the heat dissipation element according to embodiments of the present disclosure.

FIG. 8 is a schematic structural diagram illustrating an extension portion of the heat dissipation element according to embodiments. As illustrated in FIG. 8, the extension portion 134 of the heat dissipation element 13 has a second surface 1341 away from the step-down conversion circuit 12 and a first surface 1342 opposite the second surface 1341. The first surface 1342 and the second surface 1341 are provided with the multiple bosses 137.

The heat dissipation element 13 includes the extension portion 134 extending beyond the step-down conversion circuit 12. The extension portion 134 has the second surface 1341 away from the step-down conversion circuit 12 and the first surface 1342 opposite the second surface 1341. The first surface 1342 and the second surface 1341 are provided with the multiple bosses 137. The area for heat dissipation can be expanded from both surfaces of the extension portion 134 to accelerate heat dissipation of the heat dissipation element 13. The extension portion 134 can also be disposed between the fan 14 and the air outlet 113. The fan 14 can accelerate air motion between the extension portion 134 and the air outlet 113, accelerating the cooling of the accommodating space 112 and the step-down conversion circuit 12.

In at least one embodiment, the multiple side walls 111 of the box body 11 are made of heat insulation materials.

The multiple side walls 111 of the box body 11 are made of heat insulation materials. The heat insulation material can block heat flow, and the multiple side walls 111 may be made of one or more of glass fiber, asbestos, rock wool, silicate, aerogel felt, vacuum board, and other materials. Since the multiple side walls 111 of the box body 11 are made of heat insulation materials, heat in the accommodating space 112 defined by the multiple side walls 111 is difficult to be dissipated from the multiple side walls 111, which may not affect other components in the electronic device. The heat in the accommodating space 112 exits through the air outlet 113, to achieve controllable dissipation direction and convenient control.

In at least one example, the heat dissipation element 13 is a copper sheet or a graphite sheet.

Figure 9:
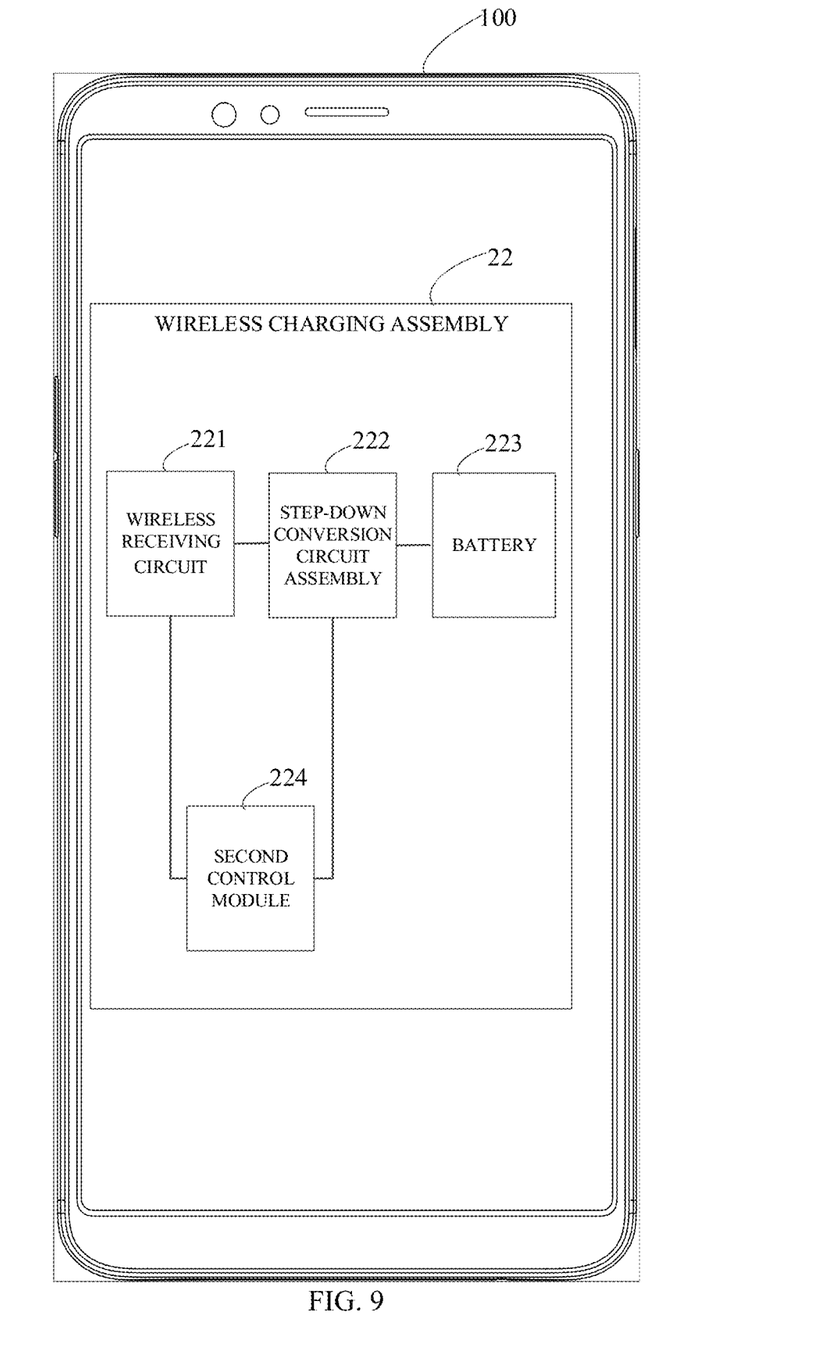
FIG. 9 is a schematic structural diagram illustrating an electronic device according to embodiments of the present disclosure.

FIG. 9 is a schematic structural diagram illustrating an electronic device according to embodiments. As illustrated in FIG. 9, the electronic device 100 includes a wireless charging assembly 22. The wireless charging assembly 22 includes a wireless receiving circuit 221, a step-down conversion circuit assembly 222, a battery 223, and a second control module 224.

The wireless receiving circuit 221 is configured to receive energy transmitted by a wireless transmitting circuit. The step-down conversion circuit assembly 222 is electrically coupled with both the wireless receiving circuit 221 and the battery 223. The second control module 224 is electrically coupled with both the wireless receiving circuit 221 and the step-down conversion circuit assembly 222. The step-down conversion circuit assembly 222 is the step-down conversion circuit assembly of any of the above embodiments.

Figure 10:
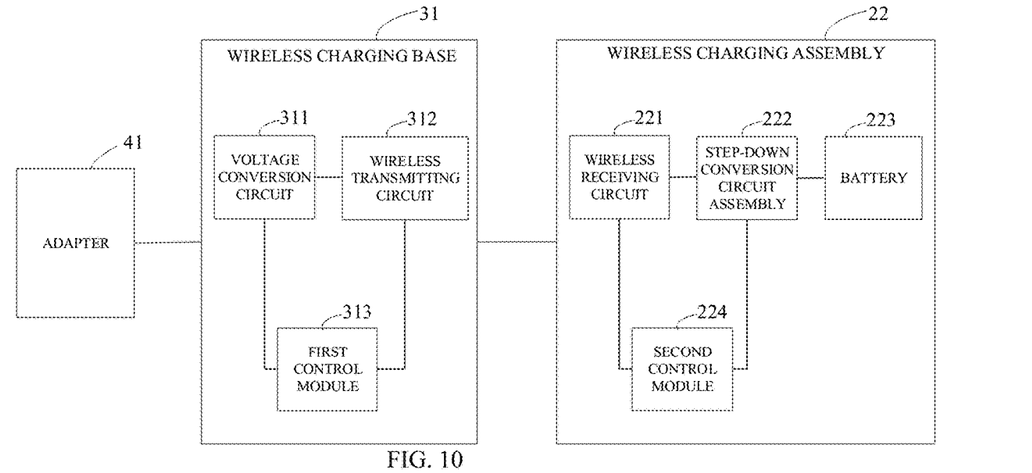
FIG. 10 is a schematic diagram illustrating a wireless charging module according to embodiments of the present disclosure.

As illustrated in FIG. 10, the wireless charging assembly 22 needs to cooperate with the wireless charging base 31 when used. The wireless charging base 31 is coupled with a power source (such as mains electricity) through an adapter 41. The adapter 41 is configured to convert the mains electricity (such as 220V) to voltage suitable for the wireless charging base 31. The wireless charging base 31 includes a voltage conversion circuit 311, a wireless transmitting circuit 312, and a first control module 313. The wireless charging assembly 22 is provided in the electronic device. The wireless charging assembly 22 includes the wireless receiving circuit 221, the step-down conversion circuit assembly 222, the battery 223, and the second control module 224.

Figure 11:
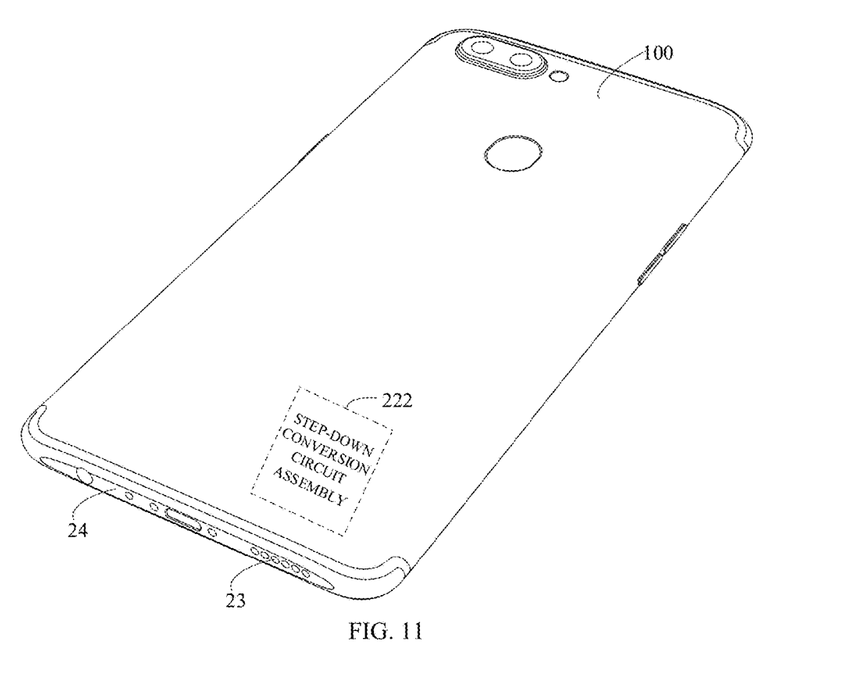
FIG. 11 is a schematic structural diagram illustrating an electronic device according to other embodiments of the present disclosure.

FIG. 11 is a schematic structural diagram illustrating an electronic device according to other embodiments. As illustrated in FIG. 11, the step-down conversion circuit assembly 222 is disposed inside the electronic device 100. The electronic device 100 defines a through hole 23 on an edge of the electronic device 100. The air outlet 113 of the step-down conversion circuit assembly 222 communicates with the through hole 23.

The through hole 23 of the electronic device 100 may be a through hole 23 already defined in the electronic device 100, such as a charging port, a data transmission port, an earphone hole, a sound output hole, and the like. Thus, the heat in the step-down conversion circuit assembly 222 can be quickly dissipated, and the temperature of the step-down conversion circuit can be quickly reduced.

In at least one embodiment, the electronic device 100 has a first side 24. The through hole 23 is defined on the first side 24, and the step-down conversion circuit assembly 222 is adjacent to the first side 24.

The first side 24 may be any one of a top side, a bottom side, and a side of the electronic device 100. The step-down conversion circuit assembly 222 is adjacent to the first side 24. The closer the air outlet 113 of the step-down conversion circuit assembly 222 to the through hole 23 on the edge of the electronic device 100, the faster the heat dissipation.

It should be noted that, in embodiments of the disclosure, the "electronic device" can include but is not limited to a device configured via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or another data connection line or network connection line. Examples of the wireless interface may include, but are not limited to, a wireless interface with a cellular network, a wireless local area network (WLAN), a digital television network (such as a digital video broadcasting-handheld (DVB-H) network), a satellite network, an AM-FM broadcast transmitter, and/or with another communication terminal. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or other electronic devices equipped with radio telephone receiver such as a conventional laptop or a handheld receiver.

The wireless charging device of the embodiments includes an adapter, where the adapter includes a control unit. With respect to communication contents between the control unit of the adapter and the electronic device (such as a smartphone) and a control manner of the control unit for output of the adapter in a second charging mode, the embodiments are not limited. For example, the control unit can communicate with the electronic device (such as a smartphone) to exchange present voltage or present remaining capacity of the battery in the electronic device (such as a smartphone), and adjust output voltage or output current of the adapter based on the present voltage or the present remaining capacity of the battery. The communication contents between the control unit and the electronic device (such as a smartphone) and the control manner of the control unit for the output of the adapter in the second charging mode are described in detail below in conjunction with some examples.

In at least one embodiment, the electronic device can further include a wireless communication module. The electronic device is configured to conduct bidirectional communication with the wireless charging device through the wireless communication module. The wireless charging device includes the adapter. The wireless communication module of the electronic device is configured to conduct bidirectional communication with the wireless charging device and control the output of the adapter in the second charging mode. That is, the control unit of the adapter of the wireless charging device is configured to conduct bidirectional communication with the electronic device to negotiate a charging mode between the adapter and the electronic device.

The type of the wireless charging device is not limited herein. For example, the wireless charging device may be a wireless charging base or other types of devices capable of converting electrical signals into electromagnetic waves to implement wireless charging.

The number and type of external interfaces of the wireless charging device are not limited herein. In some examples, the wireless charging device may include one external interface, where the external interface can be configured to receive charging power provided by an external device and can further be configured to transmit data provided by the external device. In other examples, the wireless charging device may include multiple external interfaces. For example, the wireless charging device includes two external interfaces, where one external interface is configured to be coupled with an electronic device and the other external interface is configured to be coupled with an adapter. The external interface of the wireless charging device may include, for example, at least one of a serial port, a universal serial bus (USB), and the like. The USB interface may be, for example, a USB 2.0 interface, a USB 3.0 interface, or a TYPE-C interface.

The wireless charging manner is not limited herein. For example, wireless charging may be based on at least one of magnetic coupling, magnetic resonance, and radio waves.

In some examples, the wireless charging manner can be wireless charging based on conventional wireless charging standards. For example, the wireless charging manner can be wireless charging based on one of QI standard, A4WP standard, and PMA standard.

The electronic device further includes a wireless communication module. The wireless communication module is configured to transfer data stored in the wireless charging device or in a second electronic device coupled with the wireless charging device to the electronic device through a wireless link, or configured to transmit data stored in the electronic device to the wireless charging device or to the second electronic device coupled with the wireless charging device through the wireless link, when the wireless charging device performs wireless charging on the electronic device. The wireless charging device can have a built-in memory for storing data transmitted by the electronic device. Alternatively, the wireless charging device can be coupled with the second electronic device, and the second electronic device can be a device with a storage function such as a computer or a mobile hard disk. The wireless charging device can be coupled with the second electronic device through a wired connection or a wireless connection (such as a Bluetooth connection, a wireless-fidelity (Wi-Fi) connection, or a short-range wireless connection). The wireless communication module can store the data in the electronic device to the second electronic device via the wireless charging device.

The electronic device and the wireless charging device can communicate through a short-range wireless communication system. The short-range wireless communication system includes a transmitter device and a receiver device. The transmitter device and the receiver device can realize non-contact high-speed data transmission. In some examples, an extremely high frequency (EHF) antenna is packaged in an integrated circuit (IC) chip of the transmitter device, and thus, the transmitter device can implement high-speed wireless data transmission (e.g., a transmission speed up to 6 GB/s) based on a high carrier frequency (e.g., 60 GHz). In some examples, the EHF antenna can also be packaged in an integrated circuit (IC) chip of the receiver device, so that bidirectional communication between the transmitter device and the receiver device can be implemented. In some examples, wireless data transmission between the transmitter device and the receiver device can be realized by using electromagnetic signals. In an example, the transmitter device is provided on the electronic device and the receiver device is provided on the wireless charging device. In another example, the transmitter device is provided on the wireless charging device and the receiver device is provided on the electronic device. In yet another example, the transmitter device and the receiver device can be integrated together to enable a sending function or a receiving function in different communication situations.

It should be understood that the short-range wireless communication based on high carrier frequency has advantages of low power consumption, small size, high transmission rate, and non-contact transmission, and can also realize the function of the plug-and-play module, which can greatly improve the signal integrity and support embodiment of more flexible system, reduce standby power consumption, increase bandwidth amplitude and improve the data transmission security, and can also be compatible with supporting of high-speed video signal.

It should be understood that, the high carrier frequency can realize high speed wireless data transmission. The high carrier frequency can be an explicit carrier frequency, or can be a carrier frequency band, for example, from 30 GHz to 300 GHz, which is not limited herein.

In an example, the high carrier frequency is 60 GHz.

In some examples, the transmitter device includes an IC chip internally packaged with an EHF antenna.

For example, the transmitter device includes an independent transmission chip. For example, the independent transmission chip is the IC chip internally packaged with the EHF antenna. The transmission power of the independent transmission chip can be a high frequency of 60 GHz, thereby realizing the high-speed (e.g., 6 GB/s) data transmission between the transmitter device and the receiver device.

In some examples, the electronic device is configured to conduct bidirectional communication with the wireless charging device through the wireless communication module. The wireless charging device can include an adapter. The wireless communication module of the electronic device is configured to conduct bidirectional communication with the wireless charging device and control the output of the adapter in the second charging mode. That is, the control unit of the adapter of the wireless charging device is configured to conduct bidirectional communication with the electronic device to negotiate a charging mode between the adapter and the electronic device.

The type of data transmitted between the wireless charging device and the second electronic device is not limited herein. The wireless charging device can transmit at least one of data in USB protocol format, data in display port (DP) protocol format, or data in mobile high-definition link (MHL) protocol format.

In some examples, the wireless charging device can be configured to conduct transmission of data in various protocol formats with the second electronic device. For example, the wireless charging device can support transmission of data both in USB protocol format and MHL protocol format.

Figure 12:
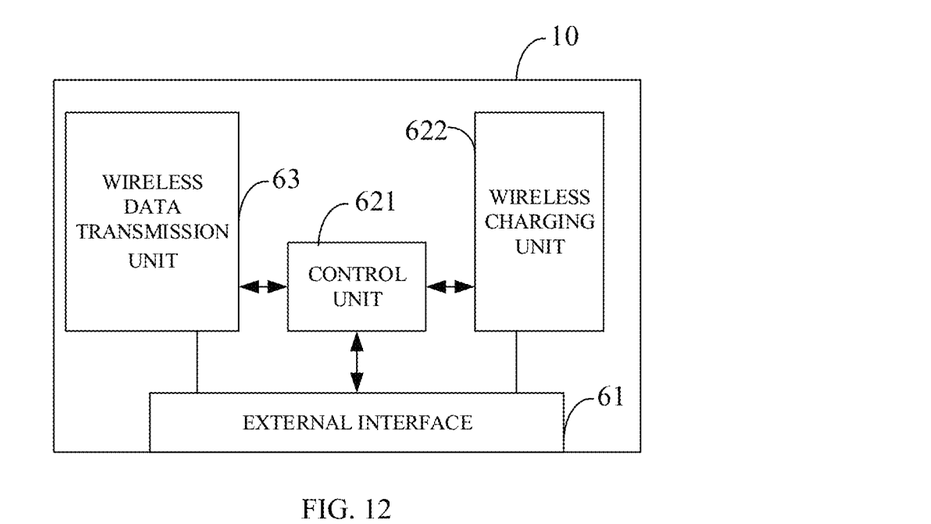
FIG. 12 is a schematic structural diagram illustrating a wireless charging device according to embodiments of the present disclosure.

The structure of the wireless charging device 10 is not limited herein, and any circuit structure capable of realizing the function of the wireless charging device 10 can be used in the embodiments of the disclosure. As illustrated in FIG. 12, the wireless charging device 10 can include a control unit 621 (for example, a microcontroller unit (MCU)), a wireless charging unit 622, and a wireless data transmission unit 63. The control unit 621 and the wireless charging unit 622 can corporately implement functions of a wireless charging control unit 62. In addition, a wireless data transmission function of the wireless data transmission unit 63 can be realized under the control of the control unit 621. Furthermore, the control unit 621 can communicate with an external device and/or control information interaction through an external interface 61. In other words, control-related functions inside the wireless charging device 10 can be integrated in the control unit 621 and are uniformly controlled by the control unit 621, which is not limited herein. Alternatively, multiple control units can be arranged in the wireless charging device 10 and are respectively used for realizing different control functions.

In an example, the control unit 621 can communicate with the electronic device 30 to identify a type of electronic device 30 and determine a power level that matches the electronic device 30. In the case that input power of the external interface 61 is direct current power, the wireless charging unit 622 can include components such as a conversion circuit and a coil. The conversion circuit can be configured to convert direct current input from the external interface 61 into alternating current, and the coil can be configured to convert the alternating current into electromagnetic waves and transmit the electromagnetic waves to the receiver device. The electronic device communicates with the wireless charging device and sends information such as the type and the power level of the electronic device to the wireless charging device so as to control output power of the wireless charging device.

Assume that the second electronic device 20 is a host device, the control unit 621 is an MCU, and the wireless charging device 10 is a wireless charging base. When the host device is coupled with the wireless charging base through an external interface of the wireless charging base, the MCU identifies power that the host device can provide and a type of data interaction supported by the host device (such as data in USB 2.0 format, data in USB 3.0 format, image data, audio/video data, etc.). Thereafter, the wireless charging device 10 can provide multiple power levels, such as a low power level (such as 5 W) and a medium power level (such as 10 W and/or 15 W), to the electronic device according to the power that the host device can provide and rules defined by conventional wireless charging standards (e.g., QI or A4WP, etc.). If the host device can provide higher power, in the embodiments, the conventional wireless charging standard (such as QI or A4WP) can be expanded so as to provide higher power levels to the electronic device. The electronic device can send its power level and control commands to the wireless charging base and/or the host device, such that the wireless charging base and/or the host device can know the power level.

It should be noted that, the foregoing describes that the wireless charging device 10 performs wireless charging based on conventional wireless charging standards as an example, but the embodiments are not limited thereto. The wireless charging device 10 can also perform wireless charging based on self-defined private standards or protocols, such as identifying the type of electronic device, the power level that matches the electronic device, and the like according to the self-defined private standards or protocols.

In some examples, the wireless charging device 10 can be coupled with the adapter via the external interface 61 and wirelessly charges the electronic device 30 based on the output power of the adapter. In other examples, the wireless charging device 10 can be used as an adapter, i.e., functions of the adapter are integrated into the wireless charging device 10. The above adapter can be a general adapter in the related art, or can also be the adapter with controllable (or adjustable) output power of the embodiments.

During wireless charging, a general adapter in the related art and the adapter with controllable output power of the embodiments are described in detail. As noted above, in order to apply the adapter to the field of wireless charging, a first possible embodiment manner is to couple the adapter to the wireless charging device, to wirelessly charge the electronic device based on the output power of the adapter. In this embodiment manner, the main function of the wireless charging device is to convert the output power of the adapter into a wireless power signal, and then to transmit the wireless power signal to the electronic device. A second possible embodiment manner is to directly use the wireless charging device as an adapter (i.e., the functions of the adapter are integrated into the wireless charging device), and to charge the electronic device by using the output power of the wireless charging device. In this embodiment manner, the wireless charging device is not only responsible for converting alternating current through operations such as transformation, rectification, and the like, but also responsible for wirelessly transmitting converted voltage and current to the electronic device, so as to wirelessly charge the electronic device. The above two embodiment manners are described in detail below in conjunction with some examples.

Figure 13:
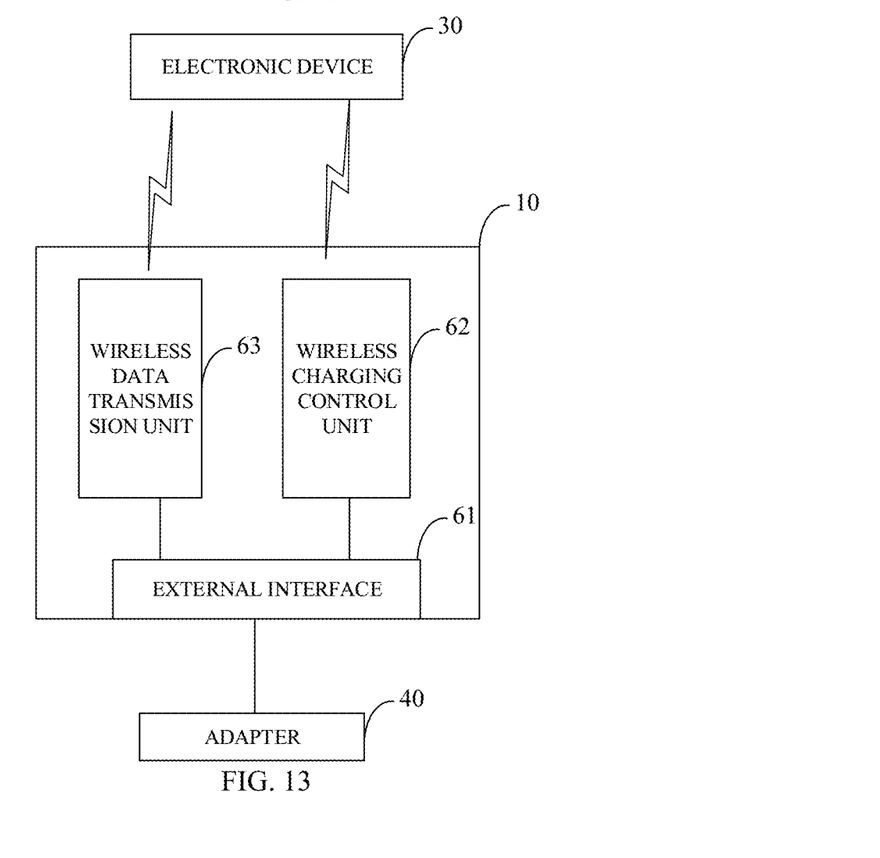
FIG. 13 is a schematic structural diagram illustrating a wireless charging system according to embodiments of the present disclosure.

With respect to the first embodiment manner, as illustrated in FIG. 13, the external interface 61 can be coupled with the adapter 40. In the case that the external interface 61 is coupled with the adapter 40, the wireless charging device 10 is mainly used for wireless charging, and the wireless data transmission unit 63 can be in an idle state or transmit information of some parameters related to wireless charging.

The type of the adapter 40 is not limited herein. In an example, the adapter 40 can be a general adapter in the related art. In another example, the adapter 40 can be an adapter that is capable of controlling its output power of the embodiments. Such adapter typically requires bidirectional communication with the external to negotiate or control the output power of the adapter.

Taking a general adapter as an example of the adapter 40, when the wireless charging device 10 identifies that the external interface 61 is coupled with the general adapter, the wireless charging control unit 62 can provide one or more power levels, such as a low power level (e.g., 5 W) and a medium power level (e.g., 10 W and/or 15 W), to the electronic device based on rules defined by wireless charging standards (e.g., QI, A4WP, etc.). When the wireless charging device 10 detects the electronic device, the wireless charging device 10 can communicate with the electronic device based on a wireless charging protocol provided by the wireless charging standards, to identify the type of electronic device and the power level that matches the electronic device. Thereafter, the wireless charging base can wirelessly charge the electronic device based on the power level matched.

Taking an adapter with adjustable output power of the embodiments as an example of the adapter 40, the wireless charging control unit 62 in the wireless charging device 10 can conduct bidirectional communication with the adapter to control (or negotiate) the output power of the adapter, and wirelessly charge the electronic device 30 according to the output power of the adapter. Therefore, compared with the general adapter in the related art, the adapter with controllable output power of the embodiments can provide higher output power, thereby providing a foundation for quick charging in the field of wireless charging.

When the wireless charging device 10 detects that the external interface 61 is coupled with an adapter, the wireless charging device 10 can conduct bidirectional communication with the adapter. If the adapter is capable of supporting bidirectional communication, the adapter is the adapter with controllable output power described above. In this case, the wireless charging control unit 62 in the wireless charging device 10 can provide one or more standard power levels, such as a low power level (e.g., 5 W) and a medium power level (e.g., 10 W and/or 15 W) to the electronic device based on rules defined by wireless charging standards (e.g., QI, A4WP, etc.). Alternatively, the wireless charging control unit 62 can expand conventional wireless charging standards (e.g., QI, A4WP, etc.) to support higher power levels. In this way, when the wireless charging device 10 detects that the external interface 61 is coupled with the adapter with controllable output power, a higher power level can be provided for the electronic device.

Alternatively, in some examples, the wireless charging device 10 can conduct bidirectional communication with the electronic device according to a bidirectional communication protocol of the embodiments (see the bidirectional communication process and instruction set for bidirectional communication between the adapter and the electronic device described above) to provide a medium power level, or even higher power level.

Taking a wireless charging base as an example of the wireless charging device 10, when the electronic device is coupled with the wireless charging base, the wireless charging base can conduct bidirectional communication with the electronic device according to the bidirectional communication protocol of the embodiments, so as to identify the type of the electronic device and conduct power matching for the electronic device. The wireless charging base can then wirelessly charge the electronic device based on the power matched. It should be noted that, the power matching can include current matching and voltage matching. Assuming that the power matched is equal to 10 W, the voltage and current can be 5 V and 2 A respectively or the voltage and current can be 10 V and 1 A respectively.

It should be noted that, communication contents between the wireless charging control unit 62 and the adapter are not limited herein, so long as the output power of the adapter can be controlled or negotiated. The communication contents between the adapter and the wireless charging control unit 62 are described below in conjunction with some examples.

In some embodiments, the adapter 40 is an adapter that supports a first charging mode and a second charging mode, and a charging speed of the adapter 40 to the electronic device 30 in the second charging mode is higher than that in the first charging mode. The wireless charging control unit 62 conducts bidirectional communication with the adapter 40 to control the output power of the adapter 40 as follows. The wireless charging control unit 62 conducts bidirectional communication with the adapter 40 to control output power of the adapter 40 in the second charging mode.

It should be noted that, the output power of the adapter 40 in the second charging mode can be determined by the wireless charging device 10 actively, determined by the wireless charging device 10 with reference to a state or capabilities of the electronic device 30, or determined by the electronic device 30. When determined by the electronic device 30, the wireless charging device 10 is mainly responsible for information or instruction transmission between the adapter 40 and the electronic device 30.

In some embodiments, the wireless charging control unit 62 can directly conduct bidirectional communication with the adapter 40 to negotiate or control the output power of the adapter in the second charging mode. For example, the wireless charging control unit 62 can conduct bidirectional communication with the adapter 40 according to the bidirectional communication protocol of the embodiments (see the bidirectional communication process and instruction set for bidirectional communication between the adapter and the electronic device described above).

In some embodiments, the wireless charging control unit 62 conducts bidirectional communication with the adapter 40 to control the output power of the adapter 40 in the second charging mode as follows. The wireless charging control unit 62 conducts bidirectional communication with the adapter 40 to negotiate a charging mode of the adapter 40.

For example, the adapter 40 can send a first instruction to the wireless charging control unit 62 to query the wireless charging control unit 62 whether to enable the second charging mode. The wireless charging control unit 62 sends a reply instruction for the first instruction to the adapter. The reply instruction for the first instruction is indicative of whether the wireless charging control unit 62 agrees to enable the second charging mode. The adapter enables the second charging mode if the reply instruction for the first instruction indicates that the wireless charging control unit 62 agrees to enable the second charging mode.

A manner in which the wireless charging control unit 62 determines whether to enable the second charging mode is not limited herein. In an example, the wireless charging control unit 62 can directly agree to enable the second charging mode. In another example, the wireless charging control unit 62 can send the first instruction to the electronic device 30, and the electronic device 30 decides whether to enable the second charging mode according to the first instruction. In yet another example, the wireless charging control unit 62 can determine whether to enable the second charging mode according to a state of the electronic device 30 (e.g., whether the electronic device supports the second charging mode and/or the present remaining battery capacity of the electronic device, etc.).

In some examples, the wireless charging control unit 62 conducts bidirectional communication with the adapter 40 to control the output power of the adapter 40 in the second charging mode as follows. The wireless charging control unit 62 conducts bidirectional communication with the adapter 40 to control output voltage of the adapter in the second charging mode.

For example, the adapter 40 can send a second instruction to the wireless charging control unit 62 to query whether present output voltage of the wireless charging control unit 62 is suitable. The wireless charging control unit 62 can send a reply instruction for the second instruction to the adapter 40. The reply instruction for the second instruction is indicative of that the present output voltage of the adapter 40 is suitable, high, or low, so that the adapter 40 adjusts its output voltage according to the reply instruction for the second instruction.

A manner in which the wireless charging control unit 62 determines the output voltage of the adapter in the second charging mode is not limited herein. In some examples, the wireless charging control unit 62 can actively determine the output voltage of the adapter in the second charging mode. For example, the wireless charging control unit 62 directly adjusts the output voltage of the adapter 40 to be a relatively high output level preset in advance after recognizing that the adapter is the adapter with controllable output power. In other examples, the wireless charging control unit 62 can communicate with the electronic device 30 and control the output voltage of the adapter in the second charging mode based on feedback information from the electronic device 30.

In some examples, the wireless charging control unit 62 conducts bidirectional communication with the adapter to control the output power of the adapter in the second charging mode as follows. The wireless charging control unit 62 conducts bidirectional communication with the adapter to control output current of the adapter in the second charging mode.

For example, the adapter 40 can send a third instruction to the wireless charging control unit 62 to query the wireless charging control unit 62 for a current value of the output current of the adapter or a maximum charging current value supported by the wireless charging device. The wireless charging control unit 62 can send a reply instruction for the third instruction to the adapter 40. The reply instruction for the third instruction is indicative of the current value of the output current of the adapter or the maximum charging current value supported by the wireless charging device, so that the adapter 40 adjusts its output current according to the reply instruction for the third instruction.

A manner in which the wireless charging control unit 62 determines the output current of the adapter in the second charging mode is not limited herein. In some examples, the wireless charging control unit 62 can actively control the output current of the adapter in the second charging mode. For example, the wireless charging control unit 62 directly adjusts the output current of the adapter to be a relatively high output level preset in advance after recognizing that the adapter is the adapter with controllable output power. In other examples, the wireless charging control unit 62 can communicate with the electronic device 30 and control the output current of the adapter in the second charging mode based on feedback information from the electronic device 30.

It should be noted that, the process where the wireless charging control unit 62 wirelessly charges the electronic device 30 according to the output power of the adapter 40 is not limited herein. In some examples, the electronic device 30 can be wirelessly charged using the wireless charging protocol provided by the conventional wireless charging standards (e.g., QI or A4WP). In other examples, the electronic device 30 can be wirelessly charged using the bidirectional communication protocol of the embodiments (see the bidirectional communication process and instruction set for bidirectional communication between the adapter and the electronic device described above).

In an example, the wireless charging control unit 62 wirelessly charges the electronic device 30 according to the output power of the adapter 40 as follows. The wireless charging control unit 62 conducts bidirectional communication with the electronic device 30 to query whether the electronic device 30 agrees to enable the second charging mode. If the electronic device 30 agrees to enable the second charging mode, the electronic device 30 is wirelessly charged according to the output power of the adapter 40 in the second charging mode.

The communication process of the conventional wireless charging only includes identifying the electronic device and confirming the power level. In the embodiments, based on the self-defined bidirectional communication protocol, the type of the electronic device (i.e., whether the electronic device supports the second charging mode) is first identified, so that the bidirectional communication protocol of the embodiments is applied to the field of wireless charging, providing a foundation for quick charging in the field of wireless charging.

In some examples, the wireless charging control unit 62 can further conduct bidirectional communication with the electronic device 30 to adjust output power of the wireless charging control unit 62 while the wireless charging control unit 62 wirelessly charges the electronic device 30 according to the output power of the adapter 40.

In the conventional wireless charging, after the power matching of the electronic device is finished, no adjustment is made for the output power of the wireless charging control unit. In the embodiments, the communication protocol between the wireless charging control unit 62 and the electronic device 30 is modified. In wireless charging control, bidirectional communication between the wireless charging control unit 62 and the electronic device 30 is maintained, so that the output power of the wireless charging control unit 62 can be adjusted in real time according to actual needs, which improves flexibility of wireless charging.

With respect to the second embodiment manner (i.e., the wireless charging device 10 is directly served as an adapter), the wireless charging control unit 62 can further be configured to receive alternating current, convert input power of the alternating current into output power of the wireless charging device 10, and wirelessly charge the electronic device 30 according to the output power of the wireless charging device 10.

The functions of the adapter are integrated into the wireless charging device, so that the number of apparatuses or devices required to be connected in the wireless charging can be reduced, and the realization is simplified.

It will be appreciated that, functions of a general adapter can be integrated into the wireless charging device 10, or the functions of the adapter with adjustable output power of the embodiments can be integrated into the wireless charging device 10. In the case that the functions of the adapter with adjustable output power of the embodiments is integrated into the wireless charging device 10, the wireless charging device 10 can conduct bidirectional communication with the electronic device to control the output power of the wireless charging device 10. The bidirectional communication mechanism between the wireless charging device 10 and the electronic device may be similar to the bidirectional communication mechanism (see above) between the adapter with adjustable output power and the electronic device during wired charging, except that the charging power between the wireless charging device 10 and the electronic device is transmitted wirelessly. The communication mechanism and charging control manner between the wireless charging device 10 and the electronic device are described in detail below in connection with some examples.

In some examples, the wireless charging device 10 can support a first charging mode and a second charging mode, and a charging speed of the wireless charging device 10 to the electronic device 30 in the second charging mode is higher than that in the first charging mode. The wireless charging device 10 conducts bidirectional communication with the electronic device 30 to control the output power of the wireless charging device 10 as follows. The wireless charging device 10 conducts bidirectional communication with the electronic device 30 to control output power of the wireless charging device 10 in the second charging mode.

In some examples, the wireless charging device 10 conducts bidirectional communication with the electronic device 30 to control the output power of the wireless charging device 10 in the second charging mode as follows. The wireless charging device 10 conducts bidirectional communication with the electronic device 30 to negotiate a charging mode of the wireless charging device 10.

In some examples, the wireless charging device 10 conducts bidirectional communication with the electronic device 30 to control the output power of the wireless charging device 10 in the second charging mode as follows. The wireless charging device 10 conducts bidirectional communication with the electronic device 30 to control output voltage of the wireless charging device 10 in the second charging mode.

In some examples, the wireless charging device 10 conducts bidirectional communication with the electronic device 30 to control the output power of the wireless charging device 10 in the second charging mode as follows. The wireless charging device 10 conducts bidirectional communication with the electronic device 30 to control output current of the wireless charging device 10 in the second charging mode.

The functions of the wireless charging device 10 have been described in detail above in connection with various embodiments, but various embodiments are independent of each other.

The step-down conversion circuit assembly and the electronic device of the embodiments are described in detail. Certain examples are used herein to explain the principles and embodiment manners of this application. The illustration of the above embodiments is merely used to help understand this application. Meanwhile, for those skilled in the art, according to the ideas of this application, there will be changes in the specific embodiment manner and application scope. In summary, the contents of this specification should not be understood as a limitation to this application.

What is claimed is:

1. A step-down conversion circuit assembly, comprising:
   a box body having a plurality of side walls, wherein the plurality of side walls define an enclosed accommodating space, and the box body defines an air outlet on one of the plurality of side walls;
   a step-down conversion circuit disposed in the accommodating space of the box body;
   a heat dissipation element comprising a first heat dissipation sub-element attached to a surface of the step-down conversion circuit and a second heat dissipation sub-element, wherein the second heat dissipation sub-element smoothly extends from an edge of the first heat dissipation sub-element and extends to contact the side wall of the box body defining the air outlet; and
   a fan disposed between the step-down conversion circuit and the air outlet and below the heat dissipation element, and configured to enable the heat in the accommodating space to exit from the air outlet.

2. The step-down conversion circuit assembly of claim 1, wherein the heat dissipation element is attached to the step-down conversion circuit through a thermally conductive silica gel.

3. The step-down conversion circuit assembly of claim 1, wherein:
   the step-down conversion circuit has a first surface and a second surface opposite the first surface; and
   the first heat dissipation sub-element is attached to the first surface and the heat dissipation element further comprises a third heat dissipation sub-element attached to the second surface.

4. The step-down conversion circuit assembly of claim 1, wherein the heat dissipation element is attached to a surface of the step-down conversion circuit and has a larger area than the surface.

5. The step-down conversion circuit assembly of claim 4, wherein the heat dissipation element is perpendicular to the side wall where the air outlet locates.

6. The step-down conversion circuit assembly of claim 4, wherein:
   the box body has an inner wall opposite the air outlet;
   the step-down conversion circuit is disposed at the inner wall; and
   the heat dissipation element comprises an extension portion extending beyond the step-down conversion circuit, wherein the extension portion is disposed between the step-down conversion circuit and the air outlet.

7. The step-down conversion circuit assembly of claim 4, wherein the first heat dissipation sub-element is parallel to the surface of the step-down conversion circuit, the surface is perpendicular to the side wall where the air outlet locates, and the second heat dissipation sub-element is disposed between the air outlet and the step-down conversion circuit.

8. The step-down conversion circuit assembly of claim 7, wherein the second heat dissipation sub-element defines a plurality of notches on a middle of the second heat dissipation sub-element, wherein the accommodating space is in communication with the air outlet through the plurality of notches.

9. The step-down conversion circuit assembly of claim 8, wherein the second heat dissipation sub-element comprises a plurality of bosses, wherein each two bosses define one notch.

10. The step-down conversion circuit assembly of claim 1, wherein the heat dissipation element comprises an extension portion extending beyond the step-down conversion circuit, wherein the extension portion has a second surface away from the step-down conversion circuit and a first surface opposite the second surface, wherein the first surface and the second surface are provided with a plurality of bosses.

11. The step-down conversion circuit assembly of claim 1, wherein the plurality of side walls of the box body are made of heat insulation materials.

12. An electronic device comprising:
    a step-down conversion circuit assembly comprising:
       a box body having a plurality of side walls, wherein the plurality of side walls define an enclosed accommodating space, and the box body defines an air outlet on one of the plurality of side walls;
       a step-down conversion circuit disposed in the accommodating space of the box body;
       a heat dissipation element comprising a first heat dissipation sub-element attached to a surface of the step-down conversion circuit and a second heat dissipation sub-element, wherein the second heat dissipation sub-element smoothly extends from an edge of the first heat dissipation sub-element and extends to contact the side wall of the box body defining the air outlet; and
       a fan disposed between the step-down conversion circuit and the air outlet and below the heat dissipation element, and configured to enable the heat in the accommodating space to exit from the air outlet.

13. The electronic device of claim 12 further comprising a wireless receiving circuit, a battery, and a second control module, wherein:
    the step-down conversion circuit assembly is electrically coupled with the wireless receiving circuit and the battery;
    the wireless receiving circuit is configured to receive energy transmitted by a wireless transmitting circuit and convert the energy into electric energy;
    the step-down conversion circuit assembly is configured to step down the electric energy converted by the wireless receiving circuit for charging the battery; and
    the second control module is electrically coupled with the wireless receiving circuit and the step-down conversion circuit assembly and configured to switch on or switch off the step-down conversion circuit assembly and the wireless receiving circuit.

14. The electronic device of claim 12 further comprising a wireless communication module, wherein the wireless communication module is configured to conduct bidirectional communication with a wireless charging device to control output power of the wireless charging device.

15. The electronic device of claim 12, wherein:
the electronic device supports a first charging mode and a second charging mode, wherein a charging speed of the electronic device in the second charging mode is higher than that in the first charging mode; and
the electronic device further comprises a wireless communication module, wherein the wireless communication module is configured to conduct bidirectional communication with a wireless charging device to control output power of the wireless charging device in the second charging mode.

16. The electronic device of claim 12 further comprising a wireless communication module, wherein the wireless communication module is configured to transmit at least one of data in universal serial bus (USB) protocol format, data in display port (DP) protocol format, or data in mobile high-definition link (MHL) protocol format.

17. The electronic device of claim 12 further comprising a wireless communication module, wherein the wireless communication module is configured to conduct bidirectional communication with a wireless charging device to negotiate a charging mode of the wireless charging device.

18. The electronic device of claim 12, wherein:
the step-down conversion circuit assembly is disposed inside the electronic device;
the electronic device defines a through hole on an edge of the electronic device; and
the air outlet of the step-down conversion circuit assembly communicates with the through hole.

19. The electronic device of claim 18, wherein the electronic device has a first side, wherein the through hole is defined on the first side, and the step-down conversion circuit assembly is adjacent to the first side.

20. A step-down conversion circuit assembly, comprising:
a box body defining an air outlet extending through a side wall of the box body;
a step-down conversion circuit disposed in the box body;
a heat dissipation element comprising a first heat dissipation sub-element attached to a surface of the step-down conversion circuit and a second heat dissipation sub-element, wherein the second heat dissipation sub-element smoothly extends from an edge of the first heat dissipation sub-element and extends to contact the side wall of the box body defining the air outlet; and
a fan disposed between the step-down conversion circuit and the air outlet and below the heat dissipation element, and configured to enable the heat in the box to exit from the air outlet.

* * * * *